United States Patent Office 3,449,536
Patented June 10, 1969

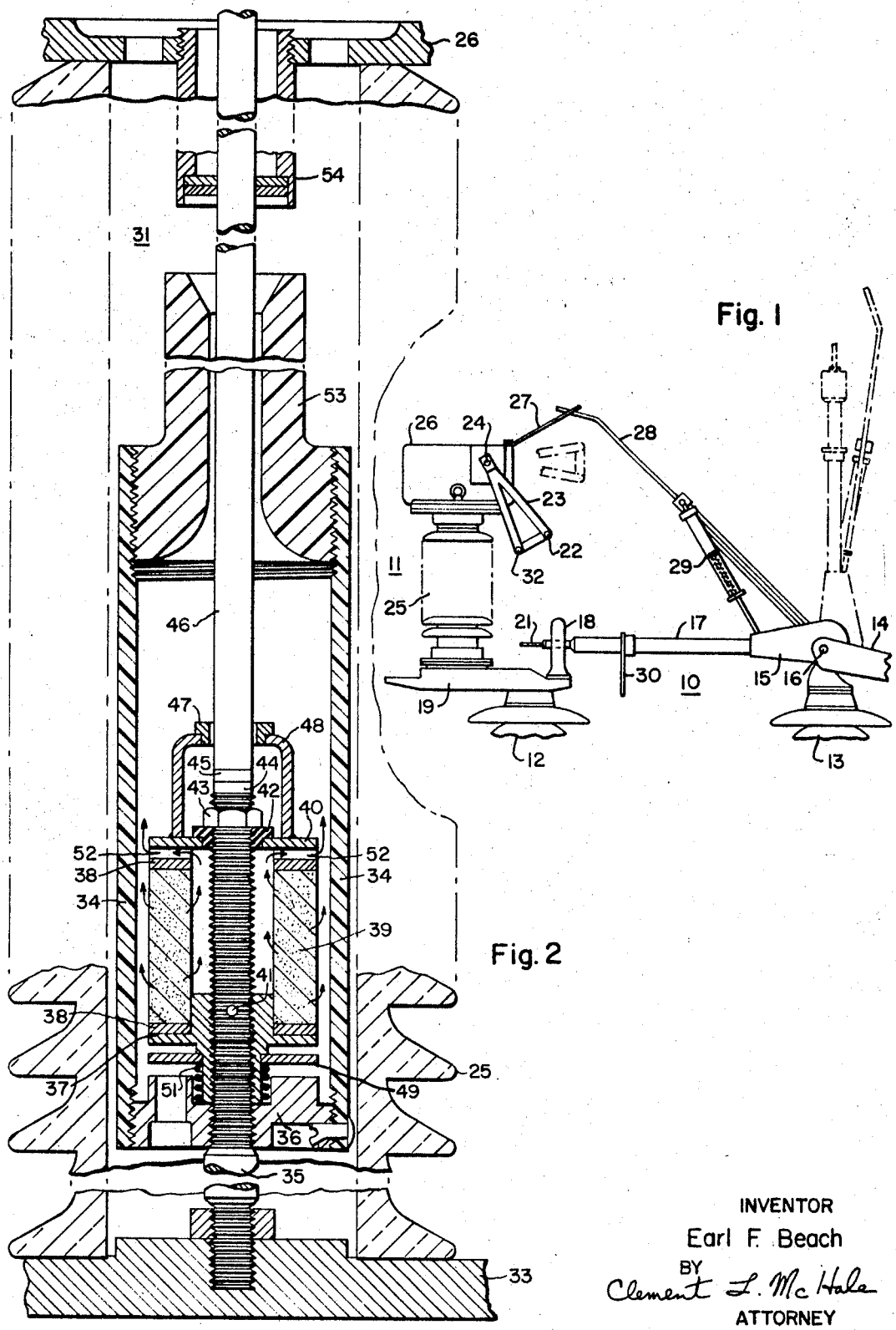

3,449,536
LOAD BREAK CIRCUIT INTERRUPTER UTILIZING ADSORBED GAS EVOLVED FROM SERIES-CONNECTED ACTIVATED CARBON
Earl F. Beach, Pittsburgh, Pa., assignor to Westinghouse Electric Corporation, Pittsburgh, Pa., a corporation of Pennsylvania
Filed Oct. 22, 1965, Ser. No. 501,137
Int. Cl. H01h 33/82, 9/30
U.S. Cl. 200—148    10 Claims

ABSTRACT OF THE DISCLOSURE

A circuit interrupter is provided having an explosion chamber with a restricted orifice outlet. A moving contact rod, movable through the restricted outlet, confines generated gas therein evolved from an activated carbon material, which is conductive and conducts the line current a portion of the opening operation.

The interrupting structure is particularly applicable for use with a load-break disconnecting switch of the swinging blade type in which normally the interrupting structure is electrically bypassed by the switch blade.

---

This invention relates, generally, to circuit interrupters and, more particularly, to an interrupter for utilization with an electric switch of the load-break type.

An object of the invention, generally stated, is to provide a circuit interrupter which shall be simple and efficient in operation and which may be economically manufactured and installed.

A more specific object of the invention is to provide for efficiently utilizing sulfur hexafluoride ($SF_6$) gas and activated carbon in a circuit interrupter.

As described in a copending application Ser. No. 501,180, filed Oct. 22, 1965 by Daniel Berg and Thomas W. Dakin, activated carbon has the ability to adsorb $SF_6$ gas when cool and expel the gas under pressure when the temperature of the carbon is increased. U.S. patent application, Ser. No. 501,361, filed Oct. 22, 1965 by Robert G. Colclaser, Jr. and Frank L. Reese entitled, "Circuit Interrupter of the Gaseous Puffer-Type Having Series High-Current Explosion Chamber With Series-Connected Activated Carbon Therein," described a circuit interrupter of the two-break type having an explosion chamber adjacent one break and a mechanically-actuated puffer, or piston device disposed at the other series break for interrupting low-value currents. In addition, U.S. Patent 3,356,808, issued Dec. 5, 1967, Dakin et al., described an interrupting device involving a pressure-responsive movable contact with an electrically series-arranged conducting mass of material having the characteristics of desorbing an arc-extinguishing gas upon the flow of excess current therethrough. The mass, such as activated carbon, adsorbs the arc-extinguishing gas upon cooling. Small pressure-equalizing holes are provided between the pressure chamber about the separable contacts and the ballast chamber to prevent contact separation upon an increase in ambient temperature.

Accordingly, another object of this invention is to provide for heating the activated carbon at the proper time during the interrupting cycle to secure the most efficient use of the carbon and the $SF_6$ gas in a circuit interrupter.

Other objects of the invention will be explained fully hereinafter or will be apparent to those skilled in the art.

In accordance with one embodiment of the invention, activated carbon is disposed inside an explosion pot which is disposed inside an interrupting chamber filled with $SF_6$ or other electronegative gas. Current does not pass through the carbon while the contact members of the interrupter are closed. When an arc drawn between the separating contact members, the carbon is connected in series into the circuit and heated by the current, thereby causing the carbon to expel $SF_6$ gas through an orifice at one end of the explosion pot to extinguish the arc.

For a better understanding of the nature and objects of the invention, reference may be had to the following detailed description, taken in conjunction with the accompanying drawing, in which:

FIGURE 1 is a view, in side elevation, of a portion of a disconnecting switch structure embodying the principal features of the invention; and, FIG. 2 is an enlarged view, in section, of the interrupter utilized in the switch shown in FIG. 1.

Referring to the drawings, and particularly to FIG. 1, the structure shown therein comprises a portion of a disconnecting switch assembly 10 and an interrupting device 11. The disconnecting switch assembly 10 may be of the type described in Patent No. 2,363,360, issued Nov. 21, 1944 to H. L. Rawlins. The switch structure comprises three spaced insulator stacks, only two of which are shown in the present drawing. The insulator stacks are mounted upon a base which is not shown in the present drawing.

One of the insulator stacks 12 is fixed on the base, and the other insulator slack 13 is rotatably mounted on the base. The third insulator stack is fixed on the base, and the top of the stack is connected to the switch structure by means of a supporting and bracing member 14. A housing 15 is pivotally mounted on the member 14 by means of pivot pins 16. As described in the aforesaid patent, a disconnecting switch blade 17 may be actuated into and out of engagement with spaced contact jaws 18 by rotating the insulator 13 by means of a suitable driving mechanism.

The operating mechanism for the disconnecting switch is so constructed that the switch blade 17 is first rotated about its axis to release contact pressure between the end of the switch blade and the spaced contact jaws 18, and is then pivotally actuated from the horizontal position to a substantially vertical position as shown by the broken lines in FIG. 1. Thus, a power conductor (not shown) which may be connected to a terminal plate 19 mounted on the insulator 12, is disconnected from a conductor (not shown) which may be connected to a terminal plate mounted on the third insulator stack and connected to the member 14.

When the blade 17 is disconnected from the contact jaws 18, the current is compelled to flow through the interrupting device 11 and auxiliary blade 28 both of which will be fully described hereinafter. As the blade 17 is raised, a tip end 21 on the blade 17 strikes a laterally extending projection 22 disposed at the end of a crank arm 23 to effect rotation of a drive shaft 24, thereby causing operation of an overcenter toggle spring mechanism disposed inside a housing 26 mounted on the upper end of the interrupting device 11.

The operation of the toggle mechanism causes separation of contact members disposed inside an insulating housing 25 of the interrupting device, thereby interrupting the circuit which previously extended from the terminal plate 19 through the contact members in the interrupting device, the housing 26, an auxiliary contact member 27 mounted on top of the housing 26, and an auxiliary or isolating switch blade 28 to the supporting member 14 to which the blade 28 is pivotally connected. The auxiliary blade 28 is biased by a spring assembly 29 toward the auxiliary contact member 27. Since the arc is interrupted inside the interrupting device 11, no arc is drawn between the auxiliary contact member 27 and the auxiliary blade 28 during opening of the circuit.

As previously explained, the tip 21 on the blade 17 engages the projection 22 on the crank arm 23 to actuate the crank arm to the position shown by the broken lines in FIG. 1. Subsequently, an arm 30, which is attached to the blade 17 and is rotated to extend in a lateral direction, engages the auxiliary blade 28 and moves the latter to the position shown by the broken lines as the main blade 17 is raised to its open position.

During the closing operation, the main switch blade 17, together with the auxiliary blade 28, swing in a counter-clockwise direction about the pivot pin 16. As the blades are being closed, the end of the auxiliary blade 28 first engages the auxiliary contact member 27 mounted on the housing 26 of the circuit interrupting device 11. However, the circuit through the interrupter 11 is not closed at this time because of the separated condition of the contact members inside the housing 25. As the blade 17 continues to travel in a counter-clockwise direction, the tip 21 engages a projection 32 on the crank arm 23, thereby actuating the crank arm to the position shown by the full lines and causing the operation of the toggle mechanism in the housing 26 to close the contact members of the interrupting device. This completes the circuit through the interrupting device and continued travel of the main switch blade 17 causes it to move between the spaced jaws 18.

The rotation of the blade 17 at the end of its closing movement causes an increase in the contact pressure between the blade 17 and the contact jaws 18. Thus, a low resistance path is provided through the main switch members, thereby causing current to flow through the low resistance, high pressure contact path rather than the relatively high resistance path through the interrupting device and the auxiliary switch members.

Referring to FIG. 2, the interrupter device 11 may be generally of the type described in Patent No. 3,032,632, issued May 1, 1962 and comprises a chamber 31 formed by the insulator 25, a mounting plate 33 and the housing 26. The chamber 31 is filled with $SF_6$ or other electro-negative gas under pressure. Within the chamber 31 there is disposed an explosion pot comprising a tube 34 and its component parts. The tube 34, which may be composed of an arc resisting material, such as polytetrafluoroethylene, which is sold under the trade name "Teflon," is supported on a contact rod 35 by a check valve body 36. Within the tube 34 there is disposed a carbon block assembly comprising a support washer 37, contact washers 38, a carbon block 39 and a retaining washer 40. The supporting washer 37 may be secured in position on the rod 35 by a pin 41 and the retaining washer 40 may be held in place on the rod by means of an insulating washer 42 and a nut 43 threaded on the rod 35.

When the disconnect switch is operated in the manner hereinbefore described, the main blade 17 is twisted out of the break jaws and rises to engage the tripping mechanism. During this time, which is relatively short, the load current passes through the interrupter. The current path is from the base plate 33, through rod 35, contact tips 44 and 45, movable contact rod 46 and a flexible conductor (not shown) to the housing 26 as in prior switches.

It will be noted that the current bypasses the carbon block 39. It is essential to the proper operation of the interrupting device that the $SF_6$ gas be released from the activated carbon at the proper time. If the carbon block were in series with the moving contact rod 46, it would be heated during the time the main blade is rising to engage the tripping mechanism and pressure would be generated and dissipated too soon in the interrupting cycle.

When the operating mechanism moves contact rod 46, an arc is drawn between the contact tips 44 and 45. When the tip 45 passes through arcing contact 47, the arc is transferred to contact 47. The current path now extends from rod 35 through support washer 37, one contact washer 38, carbon block 39, the other contact washer 38, washer 40, support bracket 48, arcing contact 47 and moving contact rod 46. Thus, the carbon is connected in series-circuit relation with the arc.

As explained hereinbefore, the current passing through the carbon block heats the carbon causing it to expel a volume of $SF_6$ gas several times that of the normal volume of the explosion pot. The expanding gas causes valve disc 49 to move against the force of spring 51 and seat on valve seat 36, thereby closing the lower end of the explosion pot or chamber.

The carbon block 39 is of a cylindrical shape in order that the gas can escape to the chamber by going to the outside and inside surfaces. The gas passing to the inside escapes through passages 52 in the washer 40.

When the moving contact 45 passes beyond the end of orifice 53, the pressure in the chamber is released and the gas flow extinguishes the arc between contacts 45 and 47 at the next current zero or prevents its re-ignition if it has already been extinguished. The moving contact rod 46 is guided by a guide tube 54 at the upper end of the chamber 31. The moving contact tip 45 passing through the orifice 53 serves as a moving cork to retain the expanding gas within the explosion pot. The force of the gas against the end of contact tip 45 helps the mechanism spring to accelerate the contact rod 46. This shortens the total travel time, thereby reducing the burning time on the contact tips which provides longer operating life.

After the arc has been extinguished, the pressure within the explosion chamber will drop, valve disc 49 will be lifted from its seat by spring 51 and cool gas from the bottom of the interrupter will fill the explosion chamber. The heated carbon block will cool and re-adsorb gas at a rate that is in proportion to its rate of temperature drop. The temperature drop of the carbon block from red hot to black is very rapid and is progressively slower as the temperature approaches normal. The volume of the carbon block must be in proportion to the maximum current to be interrupted in order to make several high current interruptions within a limited time. The first interruption will generate the maximum pressure within the explosion chamber, then a smaller volume of gas will be re-adsorbed for making the second interruption and so on. Thus, to make three interruptions, one after another, the carbon block must have sufficient volume to make sure that sufficient gas will be adsorbed after the first interruption to provide a gas pressure sufficiently high for good performance during successive interruptions.

From the foregoing description, it is apparent that the invention provides a circuit interrupter for an electric switch which is simple in structure and operation and is highly effective in terrupting relatively large amounts of current at relatively high voltages. The interrupter is particularly suitable for use with disconnect switches of the load-break type.

Since numerous changes may be made in the above-described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A circuit-interrupting device including, in combination:
   (a) casing means (25) for confining an electro-negative arc-extinguishing gas;
   (b) means defining an explosion chamber (34) disposed inside said casing means (25) having a restricted outlet (53);

(c) contact means including a movable contact rod (46) movable out of said restricted outlet (53) for establishing an arc interiorly of said explosion chamber (34);
(d) a body of activated carbon (39) disposed within said explosion chamber for adsorbing a quantity of the electronegative arc-extinguishing gas;
(e) means preventing current flow through said body of activated carbon in the closed or non-interrupting state of said circuit-interrupting device;
(f) means including the movable contact rod (46) for defining a main current path through the device in the closed position thereof;
(g) means for transferring a sufficient amount of the series current through the device from said main current path through the body of activated carbon during the opening operation of the device, whereby to evolve gas therefrom due to the heating thereof;
(h) means including said restricted outlet (53) for directing the evolved gas emitted from said body (39) into the established arc drawn through the outlet (53) to effect the extinction thereof; and,
(i) the body of activated carbon (39) not coming into contact with the direct arcing.

2. The circuit-interrupting device of claim 1, wherein the restricted outlet (25) is at one end of the explosion chamber (34), valve means (49) disposed adjacent the other end of the explosion chamber, and said valve means being arranged to close upon a rise of pressure within the explosion chamber.

3. The circuit-interrupting device of claim 1 wherein the body of activated carbon (39) is cylindrical in configuration.

4. The combination of claim 3, wherein a stationary contact post (35) extends centrally through the cylindrical body of activated carbon and supports a stationary contact (44), and one end of the movable contact rod supports a movable contact (45) which is engageable with said stationary contact.

5. The circuit-interrupting device of claim 1, wherein the transferring means includes an arcing contact (47) disposed along the path of movement of the movable contact rod (46) and electrically connected to said body of activated carbon.

6. In an electrical switch, in combination:
(a) a main switch blade;
(b) a main contact member engaged by the main switch blade;
(c) operating means for disengaging the main switch blade from the main contact member;
(d) an auxiliary switch blade actuated by the main switch blade;
(e) an auxiliary contact member engaged by the auxiliary blade;
(f) an interrupting device connected to the main contact member;
(g) said interrupting device including:
  (i) casing means (25) for confining an electronegative arc-extinguishing gas;
  (ii) means defining an explosion chamber (34) disposed inside said casing means (25) having a restricted outlet (53);
  (iii) contact means including a movable contact rod (46) movable out of said restricted outlet (53) for establishing an arc interiorly of said explosion chamber (34);
  (iv) a body of activated carbon (39) disposed within said explosion chamber for adsorbing a quantity of the electronegative arc-extinguishing gas;
  (v) means preventing current flow through said body of activated carbon in the closed or non-interrupting state of said circuit-interrupting device;
  (vi) means including the movable contact rod (46) for defining a main current path through the device in the closed position thereof;
  (vii) means for transferring a sufficient amount of the series current through the device from said main current path through the body of activated carbon during the opening operation of the device, whereby to evolve gas therefrom due to the heating thereof;
  (viii) means including said restricted outlet (53) for directing the evolved gas emitted from said body (39) into the established arc drawn through the outlet (53) to effect the extinction thereof; and,
  (ix) the body of activated carbon (39) not coming into contact with the direct arcing,
(h) said auxiliary contact member being attached to the interrupting device,
(i) an actuating mechanism operated by the main switch blade for separating the contact means within the interrupting device to draw an arc within the interrupting device after the main switch blade has been disengaged from the main contact member.

7. The electrical switch according to claim 6, wherein the transferring means includes an arcing contact (47) disposed along the path of movement of the movable contact rod (46) and electrically connected to said body of activated carbon.

8. The combination of claim 1, wherein the electronegative arc-extinguishing gas is sulfur-hexafluoride ($SF_6$) gas.

9. In a circuit interrupter, in combination, a generally cylindrical interrupting chamber containing $SF_6$ gas, a generally cylindrical explosion chamber disposed inside the interrupting chamber, a fixed contact rod extending from the bottom of the interrupting chamber through the bottom of the explosion chamber, valve means at the bottom of the explosion chamber, orifice means at the top of the explosion chamber, a movable contact rod extending through the orifice means and out through the top of the interrupting chamber, a generally cylindrical block of activated carbon disposed around the fixed contact rod inside the explosion chamber, said movable contact rod being separable from the fixed contact rod to draw an arc within the explosion chamber, arcing contact means disposed around the movable contact rod for connecting the carbon in series-circuit relation with the arc, said carbon being heated by the arc current to expel $SF_6$ gas under pressure, and said movable contact rod being moved through the orifice means to permit the gas to flow through the orifice means to extinguish the arc.

10. In a circuit interrupter, in combination, a generally cylindrical interrupting chamber containing $SF_6$ gas, a generally cylindrical explosion chamber disposed inside the interrupting chamber, a fixed contact rod extending from the bottom of the interrupting chamber through the bottom of the explosion chamber, valve means at the bottom of the explosion chamber, orifice means at the top of the explosion chamber, a movable contact rod extending through the orifice means and out through the top of the interrupting chamber, a generally cylindrical block of activated carbon disposed around the fixed contact rod inside the explosion chamber, said movable contact rod being separable from the fixed contact rod to draw an arc within the explosion chamber, arcing contact means disposed around the movable contact rod for connecting the carbon in series-circuit relation with the arc, said carbon being heated by the arc current to expel $SF_6$ gas under pressure, said valve means being closed by the pressure of said gas, said movable contact rod being moved through the orifice means to permit the gas to flow through the orifice means into the interrupting chamber to extinguish the arc, and spring means for opening the valve means to permit gas to flow into the explosion chamber from the interrupting chamber after the arc is extinguished and the carbon is cooled to re-adsorb the gas.

References Cited

UNITED STATES PATENTS 3,077,526 2/1963 Owens _____ 200—149 XR
3,122,728 2/1964 Lindberg.
3,356,808 12/1967 Dakin et al. _____ 200—140

FOREIGN PATENTS 1,154,548 9/1963 Germany.
525,244 8/1940 Great Britain.

ROBERT S. MACON, *Primary Examiner.*

U.S. Cl. X.R.

200—144, 146